US012494303B2

(12) United States Patent
Czyzewski

(10) Patent No.: US 12,494,303 B2
(45) Date of Patent: Dec. 9, 2025

(54) CONDUCTOR FOR ELECTRIC CURRENT, METHOD OF MANUFACTURING THE CONDUCTOR AND USE OF CONDUCTOR FOR CONDUCTING ELECTRIC CURRENT WITH AC COMPONENT

(71) Applicant: Hitachi Energy Ltd, Zürich (CH)

(72) Inventor: Jan Czyzewski, Cracow (PL)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/272,209

(22) PCT Filed: Feb. 11, 2022

(86) PCT No.: PCT/EP2022/053366

§ 371 (c)(1),
(2) Date: Jul. 13, 2023

(87) PCT Pub. No.: WO2022/175178

PCT Pub. Date: Aug. 25, 2022

(65) Prior Publication Data

US 2024/0145127 A1 May 2, 2024

(30) Foreign Application Priority Data

Feb. 16, 2021 (EP) .................................... 21157335

(51) Int. Cl.

*H01B 7/30* (2006.01)
*H01B 9/04* (2006.01)
*H01B 13/00* (2006.01)

(52) U.S. Cl.

CPC ............... *H01B 7/306* (2013.01); *H01B 9/04* (2013.01); *H01B 13/0036* (2013.01)

(58) Field of Classification Search

CPC .................................. H01B 7/306; H01B 9/04

(Continued)

(56) References Cited

U.S. PATENT DOCUMENTS 1,904,162 A 4/1933 Humphreys
2,684,993 A * 7/1954 Bowers .................. H01B 7/306 174/21 C (Continued)

FOREIGN PATENT DOCUMENTS

DE 1170486 B 2/1959
DE 8235154 U1 2/1986

(Continued)

OTHER PUBLICATIONS

International Search Report and Written Opinion of the International Searching Authority, PCT/EP2022/053366, mailed May 18, 2022, 15 pages.

*Primary Examiner* — Chau N Nguyen
(74) *Attorney, Agent, or Firm* — Sage Patent Group

(57) ABSTRACT

A conductor for conducting electric current has along its length at least two main sections comprising at least a first main section and a second main section and at least one transposing junction connecting adjacent ones of the main sections The conductor comprises several partial conductors comprising at least a first partial conductor and a second partial conductor wherein in the first main section the first partial conductor has an outer diameter which is larger than an outer diameter of the second partial conductor and, in the second main section the second partial conductor has an outer diameter which is larger than an outer diameter of the first partial conductor.

20 Claims, 14 Drawing Sheets

(58) Field of Classification Search
USPC ........................................................... 174/34
See application file for complete search history.

(56) References Cited

U.S. PATENT DOCUMENTS

| | | | | | |
|---|---|---|---|---|---|
| 2,812,502 | A * | 11/1957 | Doherty | ................. | H01B 7/306<br>174/33 |
| 2,872,501 | A | 2/1959 | McMahon | | |
| 6,313,409 | B1 | 11/2001 | Bales, Jr. et al. | | |

FOREIGN PATENT DOCUMENTS

| | | | |
|---|---|---|---|
| EP | 0022269 | A1 | 1/1981 |
| GB | 820045 | A | 9/1959 |

* cited by examiner

A-A

B-B

C-C

D-D

E-E

F-F

G-G

A-A

B-B

C-C

D-D

E-E

F-F

G-G

A-A

B-B

C-C

D-D

E-E

F-F

G-G

H-H

CONDUCTOR FOR ELECTRIC CURRENT, METHOD OF MANUFACTURING THE CONDUCTOR AND USE OF CONDUCTOR FOR CONDUCTING ELECTRIC CURRENT WITH AC COMPONENT

CROSS REFERENCE TO RELATED APPLICATIONS

This application is a 35 U.S.C. § 371 national stage application of PCT International Application No. PCT/EP2022/053366 filed on Feb. 11, 2022, which in turn claims priority to European Patent Application No. 21157335.7, filed on Feb. 16, 2021, the disclosures and content of which are incorporated by reference herein in their entireties.

TECHNICAL FIELD

The present disclosure is directed to a conductor for conducting electric current, in particular electric current with an AC component. The conductor may be used for conducting purely AC electric current or DC electric current with an added AC component. The conductor can be a rigid metallic conductor, and can have a substantially circular cross-section. The conductor can be suitable for conducting high AC current. The conductor can be used in in various parts of a power transmission or distribution system such as bushings, cable terminations, gas-insulated switchgear, gas-insulated lines, circuit breakers, switches, disconnectors or current bars, for example.

BACKGROUND

Known rigid conductors for currents with a significant AC component are in the form of solid metallic rods or hollow tubes. The operating current transmitted through the conductor is limited by the heat generated by the ohmic losses in the conductor, which is proportional to the electric resistance of the conductor. Due to the skin effect, the AC component of the current tends to flow only in the outer layer of the conductor of the thickness which is referred to as skin depth. Due to this limitation, full rod conductors are typically applied only with limited diameters. Large-diameter conductors are made only in a tubular form, with a wall thickness comparable to the skin depth. This requires applying conductors of very large diameters, which, for 50-60 Hz currents of some tens of kA may well reach diameters of the size of decimeters. This means that only a very small part of the total cross section of the conductor is used for transmitting current.

There are known ways of limiting the skin effect in flexible conductors comprising a core of insulated cables. In particular, segmental conductors are known, also referred to as Milliken conductors. The principles of segmental conductors are described, e.g., in U.S. Pat. Nos. 1,904,162 and 6,313,409 B1. In such Milliken conductors, stranded sub-conductors comprising thin round wires are rolled into a triangular cake-slice shape and a number of these sub-conductors are assembled to one round conductor.

Each of documents U.S. Pat. No. 2,872,501 A1, DE 11 70 486 B1, DE 82 35 154 U1 and EP 0 022 269 A1 discloses a conductor comprising conducting members being periodically transposed.

In a standard conductor comprising stranded wires, the distance of each individual wire to the conductor axis is constant along the length of the conductor. The AC magnetic flux, generated by the current in the conductor, flowing through the surface area between two wires, one running closer and another one running further from the conductor axis, induces a loop current flowing in the two wires, such that the effective current of the wire close to the axis is reduced and that of the one further from the axis is increased. Due to this mechanism, the current tends to flow only in the wires close to the surface of the conductor and is cancelled in the wires close to the conductor axis. Thus, the skin-effect occurs. In the segmental Milliken conductor, each individual wire wanders along the length of the conductor from a position close to the axis to a position far from the axis. In such a way, the magnetic flux is cancelled out and the loop current is not induced between individual wires and the skin effect is substantially reduced. However, this solution is specific for stranded-wire conductors and not applicable to rigid conductors of solid metal.

SUMMARY

It is an object to provide an improved conductor for conducting AC current and a method for producing the conductor.

According to a first aspect, a conductor for conducting AC electric current has along its length at least two main sections and a transposing junction connecting adjacent ones of the main sections. The conductor comprises at least two partial conductors, each of the conductors running through the main sections and the transposing junction, wherein the conductors are electrically insulated from each other in the main sections and the transposing junction. Each of the partial conductors has in each of the main sections an outer diameter. For a circular cylindrical shape, the outer diameter is twice the outer radius of the partial conductor. For a shape different from a circular cylindrical shape, the outer diameter is the maximum outer diameter of the shape. As an example, for a square shape, the outer diameter is the diagonal of the square.

In the first main section, the first partial conductor has an outer diameter which is larger than the outer diameter of the second partial conductor and in the second main section, the second partial conductor has an outer diameter which is larger than the outer diameter of the first partial conductor.

Accordingly, each of the partial conductors has a different outer diameter in each of the main sections. Thereby, current flows in each of the conductors in one of the main sections closer to the center of the conductor and in the other one of the main sections at a larger distance from the center of the conductor. In this way, the current is forced to flow in both partial conductors and, in particular, once closer to the center and once at a larger distance from the center. Thereby, the skin effect can be avoided or diminished, allowing the current to be conducted at almost the entire cross section of the conductor.

The conductor may be a round conductor. Each of the partial conductors may have a round outer shape, at least in the main sections. In particular, each of the conductors may have the shape of a cylinder. The cylinder may be filled or hollow. Both conductors may be made from the same material. As an example, a material may be aluminum, copper or respective alloys.

The partial conductors may be insulated from each other by gaps along the entire length of the main sections and transposing junctions. The gaps may be air gaps or insulating inserts, for example. The insulating inserts may comprise a hardened resin, for example. Each of the partial conductors may fully enclose a longitudinal axis of the conductor in each part of the main section. Accordingly, each of the partial conductors has a closed surface in the main sections.

As an example, in the first main section, the first conductor may have a shape of a circular cylinder having a first outer radius and the second partial conductor may have a shape of a circular cylinder having a second outer radius, wherein the first outer radius is larger than the second outer radius. In the second main section, the first conductor may have a shape of a circular cylinder having the second outer radius and the second partial conductor may have a shape of a circular cylinder having the first outer radius. In the transposing junction, the shapes, in particular the radii, of the first and second conductors change. For hollow cylinders, the thicknesses of cylinder walls may be the same for all conductors and for all diameters.

In further examples, the partial conductors may have other shapes in the main sections than circular cylinders such as cylinders with elliptical or rectangular cross-sections, for example. A rectangular cross-section can also be a square cross-section.

As an example, in the main section, the first conductor may be a hollow cylinder having a first outer diameter and the second conductor may be a filled cylinder having a second outer diameter. In the second section, the second conductor may be a filled cylinder having the second outer diameter and the first conductor may be a hollow cylinder having the first outer diameter.

In each of the main sections, the partial conductors may have a constant outer diameter along the entire length of the main section. The geometry of the partial conductor is constant along the length of the main section.

The conductor may comprise more than two main sections. As an example, when the conductor comprises exactly two partial conductors, the number of main sections may be a multiple of two.

According to an embodiment, in the first main section, the first conductor may enclose the second conductor and in the second main section, the second conductor may enclose the first conductor. In particular, the respective conductor may fully enclose the respective other conductor in a main section.

The overall conductor may have an interior structure being identical in both main sections. However, in the first main section, the geometric parts are provided by a different one of the partial conductors than in the second main section. Accordingly, the conductors switch their shapes between the main sections.

The main sections may have the same lengths. Thus, the partial conductors provide the same lengths of each of the radii. Accordingly, the magnetic flux between the conductors in each of the main sections is of a similar absolute value and of the opposite sign. Hence, the magnetic flux is cancelled out in large part, thus minimizing the induced loop current which would contribute to generating a skin effect.

For enabling a change of the radii in the transposing junction, each of the partial conductors has one or more openings in its wall for allowing one or more transposing portions of the other one of the partial conductors to cross the wall of the partial conductor such that the other one of the partial conductors can change its outer diameter.

Depending on the arrangement of openings and transposing portions, a more or less homogenous current distribution in the transposing junction may be achieved. As an example, the opening and the transposing portion may take up a half-circular shape, allowing current to flow in a half-circular section. To more evenly distribute the current, the openings may take up two quarter-circular shapes, for example.

The conductor may comprise a joining junction in which the first and second conductors are electrically connected to each other.

The joining junctions may be located at each of the ends of the conductor. Accordingly, current enters the conductor in the form of a single current path, is than split up into two or more current paths provided by the partial conductors. The current paths are joined again at the other end section into a single current path.

In a further embodiment, the conductor comprises a first portion and a second portion, each of the portions comprising at least two main sections and a transposing junction between the main sections. The conductor comprises a joining junction between the portions, wherein in the joining junction the first and second conductors are electrically connected to each other. Thus, the current paths of the partial conductors are split up or joined in the joining junctions. In each of the portions, the structure of the partial conductors can be as described in the foregoing.

Thereby, the structure of each of the partial conductors in the first and second portions can be decoupled. Accordingly, the current paths in the partial conductors in one of the portions is independent from the current paths in the partial conductors in the other one of the portions. As an example, the main sections in the first portion may have different lengths than the main sections in the second portions. Also, the shape of the partial conductors in the first portion may be different from the shape of the partial conductors in the second portion.

In embodiments, the conductor has a bend. The bend may be provided in a transposing junction or in a joining junction, for example. In this case, the current path in the main sections is linear and not disturbed in the bend. The conductor may comprise several bends in transposing or joining junctions.

In some embodiments, the conductor has exactly two partial conductors and not more than the two partial conductors. Such a conductor is called double conductor in the following.

In other embodiments, the conductor has more than the two partial conductors. As an example, the conductor may comprise three partial conductors. In particular, the conductor may have exactly three partial conductors and not more than the three partial conductors. Such a conductor is called triple conductor in the following. In this case, the conductor has a third main section and a second transposing junction between the second and third main section. Each of the three partial conductors run along all of the main sections and the transposing junctions and are electrically insulated from each other in the main sections and transposing junctions. The characteristics described in the foregoing are correspondingly valid for three partial conductors.

Each of the partial conductors may have a different outer diameter in each of the main sections. As an example, the partial conductors can take up three different outer radii in the three main sections. Each one of the partial conductors takes up the first radius in one of the main sections, the second radius in another one of the main sections and the third radius in another one of the main sections. In none of the main sections, two partial conductors have the same radius.

As an example, in each of the main sections, each of the partial conductors may have a tubular shape. In this case, the conductor has a central opening running through all main sections. The central opening may also be present in the transposing junctions. As an example, the partial conductors may have in each main section the shape of concentrically arranged hollow cylinders with different radii. Each of the hollow cylinders is provided by one of the partial conductors. In a different main section, the hollow cylinders are distributed differently between the partial conductors. In a further embodiment, the inner cylinder may be a filled cylinder, instead.

Generally, the conductor may comprise two, three or more than three conductors. The number of main sections is at least the number of conductors. In particular, the number of main sections may be a multiple of the number of conductors. Adjacent ones of the main sections may be connected by transposing junctions. In case that the total number of main sections or the number of main sections between two adjacent joining junctions is equal to the number of conductors, each of the partial conductors has a different outer diameter in each of the main sections. The specifics described in the foregoing are correspondingly applicable for multiple conductors.

According to a further aspect, a use of the conductor for conducting electric current with an AC component is disclosed. In particular, the conductor can be used in various parts of a power transmission or distribution system such as bushings, cable terminations, gas-insulated switchgear, gas-insulated lines, circuit breakers, switches, disconnectors or current bars, for example. The AC current may by a large current. For example, the AC current may be a current of several kA. The frequency may be a frequency of 50-60 Hz, for example. The current may also be a DC current with an AC component.

According to a further aspect, an electric device comprises the conductor described in the foregoing. The device may be high-current device. In particular, the device may be a generator, a transformer or a switchgear, for example.

According to a further aspect, a method of manufacturing the conductor is disclosed, wherein at least a part of the conductor is manufactured by an additive manufacturing (AM) method or by a casting method. An additive manufacturing method may be a 3d-printing method. A casting method is a method in which a material in liquid form is filled into a mold.

As an example, main sections and transposing junctions may be formed by the same additive process or casting process. It is also possible to form the transposing junctions in an additive method or casting method, separately from the main sections and, after that, connect the transposing junction to the main sections.

In a casting method, an insert may be positioned in a mold. The insert may provide the gaps insulating the partial conductors from each other. Accordingly, the insert is a part of the finished conductor.

The present disclosure comprises several aspects. Every feature described with respect to one of the aspects is also disclosed herein with respect to the other aspect, even if the respective feature is not explicitly mentioned in the context of the specific aspect.

BRIEF DESCRIPTION OF THE DRAWINGS

Further features, refinements and expediencies become apparent from the following description of the exemplary embodiments in connection with the figures.

In the figures, elements of the same structure and/or functionality may be referenced by the same reference numerals. It is to be understood that the embodiments shown in the figures are illustrative and are not necessarily drawn to scale.

DETAILED DESCRIPTION

Figure 1:
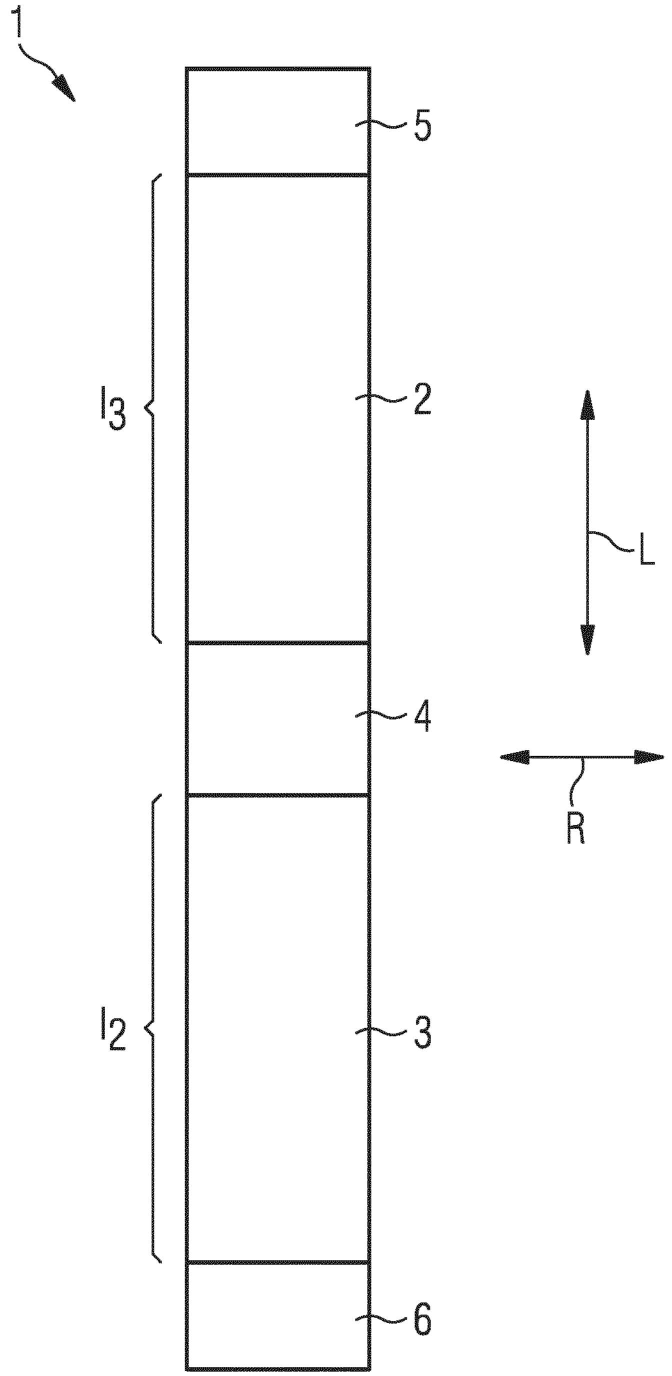
FIG. 1 shows an embodiment of a conductor with two partial conductors in a schematic side view.

FIG. 1 shows an embodiment of a conductor 1 for conducting AC electric current or DC electric current with an AC component. The conductor 1 may be used for low-voltage, medium-voltage or high-voltage electric devices. As an example, the conductor 1 may be used in a power transmission or distribution system.

As examples, the conductor 1 may be used in switchgears, such as gas-insulated switchgears, generators or transformers. The conductor 1 may be used in bushings, such as high-current transformer or generator bushings, in gas-insulated lines, or in insulated current bars.

The conductor 1 has a round cross-sectional shape. The conducting parts of the conductor 1 comprise metals such as copper or aluminum, for example.

Along its length, the conductor 1 comprises two main sections 2, 3 and a transposing junction 4 between the main sections 2, 3. Furthermore, the conductor 1 comprises a first end section 5 and a second end section 6.

The conductor 1 comprises two partial conductors (see FIG. 2) insulated from each other along the entire lengths of the main sections 2, 3 and the transposing junction 4. The conductor 1 comprises exactly the two partial conductors and not more partial conductors. Accordingly, the shown conductor 1 is a double conductor. Each of the partial conductors provides a current path.

The partial conductors have structures such that in the main sections 2, 3 current flows in the direction of the length L of the conductor 1. In the transposing junction 4, current flows at least in parts of the transposing junction 4 in a thickness or radial direction R or at an angle toward the length L. In particular, current flowing in the direction of the length L in the first main section 2 is forced to flow in a thickness direction R. In the second main section 3, the current flows in the direction of the length L again, but at a different distance from the center of the conductor 1 than in the first main section 2. Accordingly, the transposing junction 4 serves to switch the distance of the current path from the center of the conductor 1.

This structure helps avoiding the skin effect and, thus, substantially the full thickness of the conductor can be used for conducting current. The skin effect leads to an AC current flowing substantially only in an outer region of a conductor, the outer region having a thickness of an order of the so-called "skin depth".

For effectively cancelling the skin effect, the lengths 12 and 13 of the main sections 2, 3 are the same. In addition to that, the number of main sections 2, 3 for a double conductor 1 should be a multiple of two.

Figure 2:
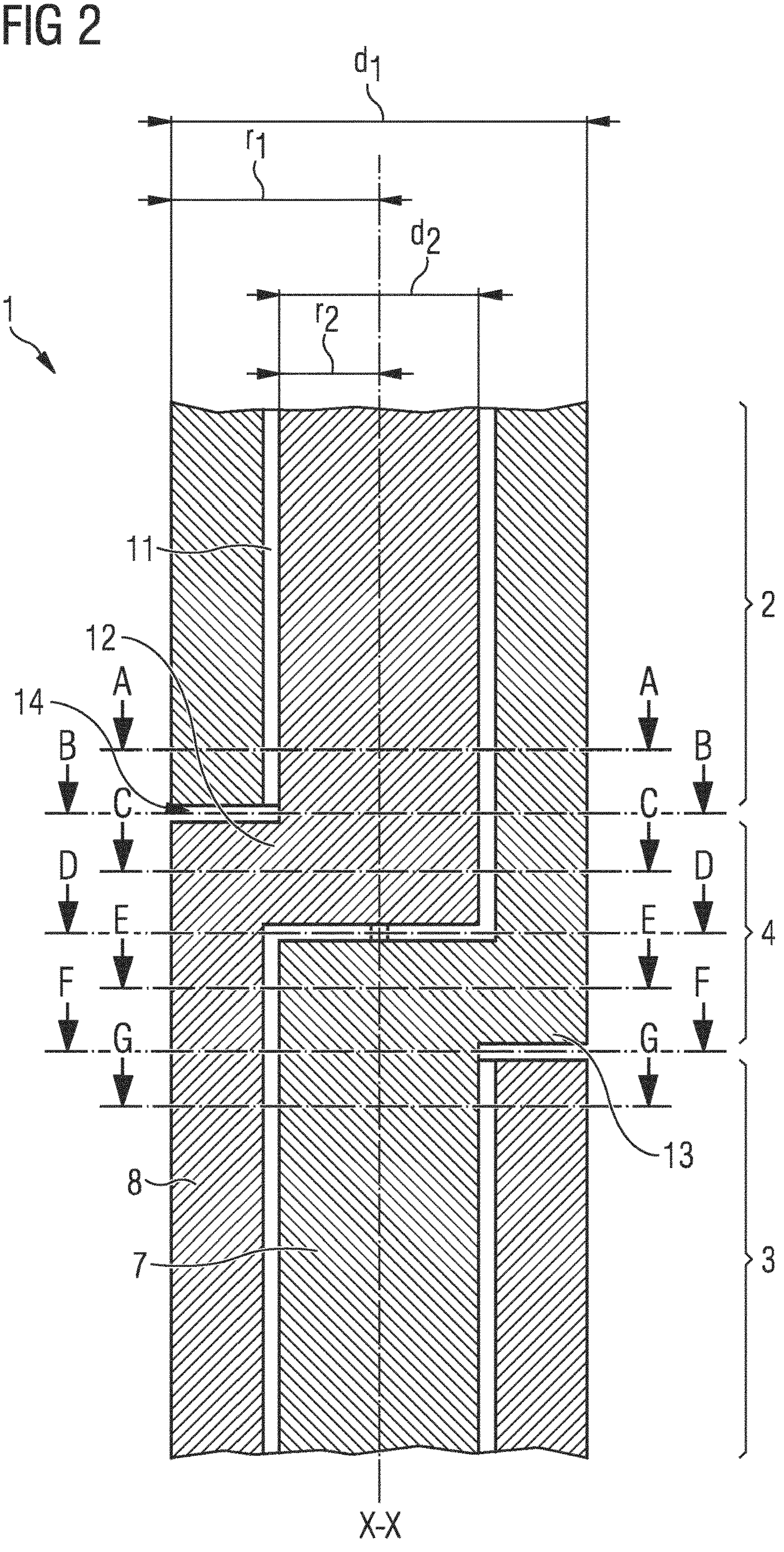
FIG. 2 shows an embodiment of a conductor with two partial conductors in a longitudinal sectional view.

FIG. 2 shows an embodiment of a double conductor 1 in a longitudinal sectional view. FIGS. 3A to 3G show the conductor 1 in cross-sectional views at different positions marked by A-A to G-G in FIGS. 2 and FIG. 3A to 3G, respectively. The conductor 1 may be the conductor 1 of FIG. 1, for example.

Figure 3A:
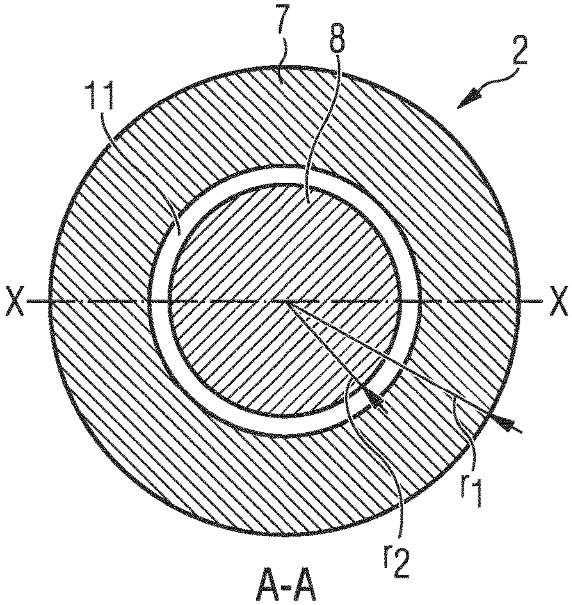
FIGS. 3A to 3G are cross-sectional views of the conductor of FIG. 2 at different positions.
Figure 3B:
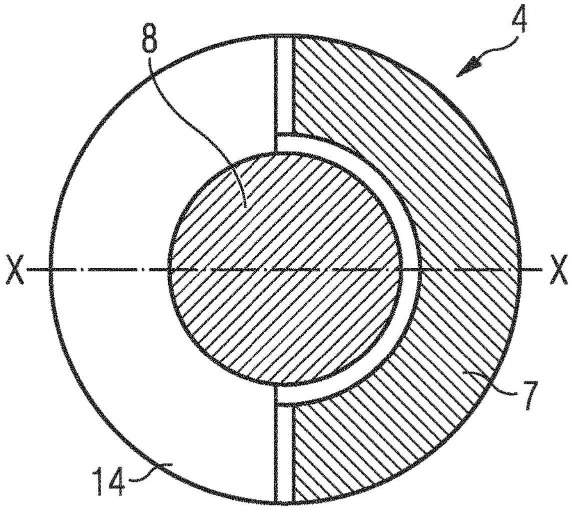
Figure 3C:
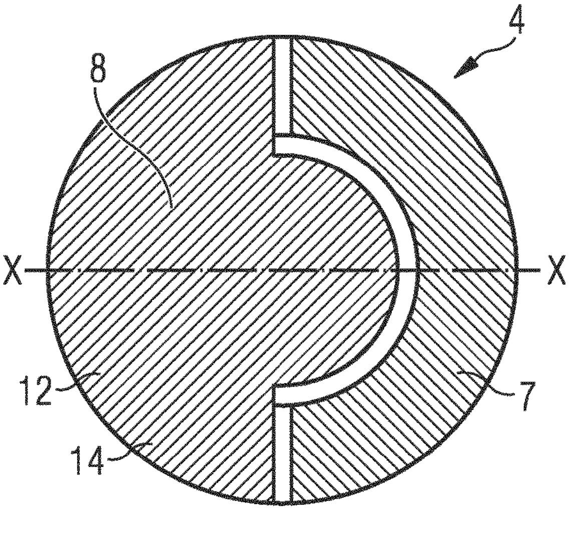
Figure 3D:
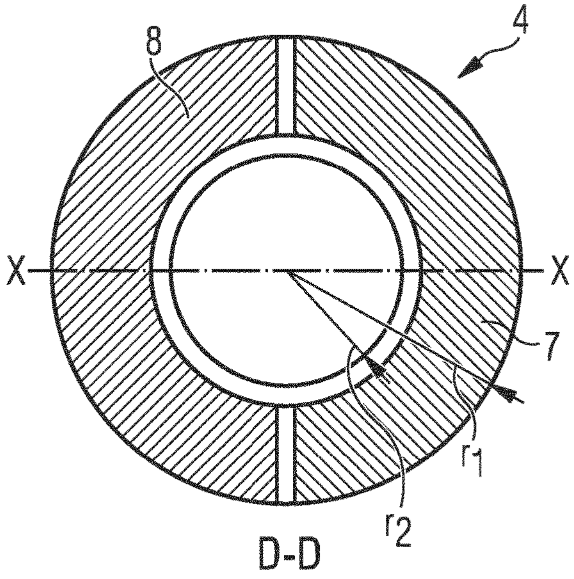
Figure 3E:
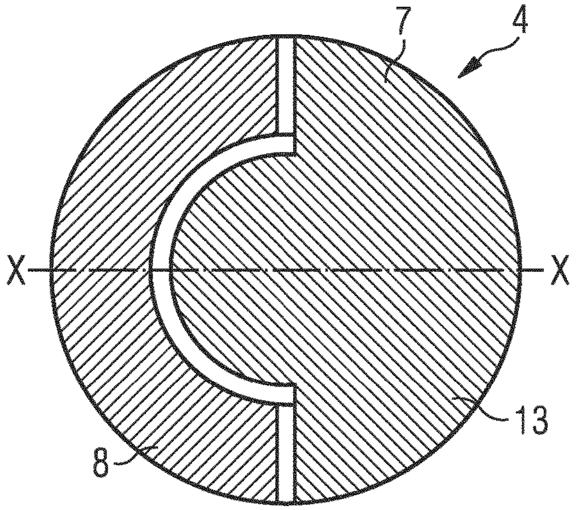
Figure 3F:
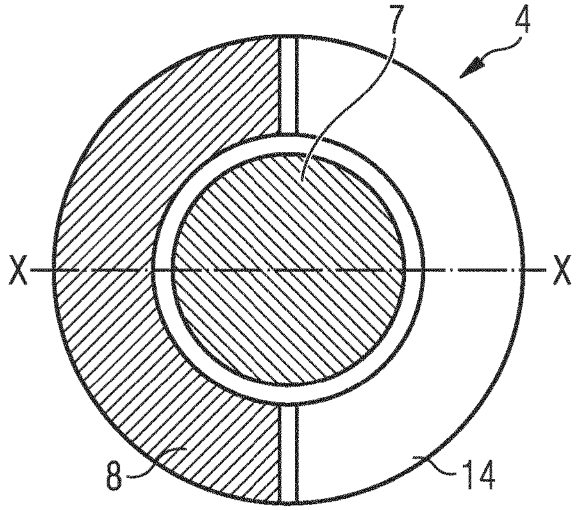
Figure 3G:
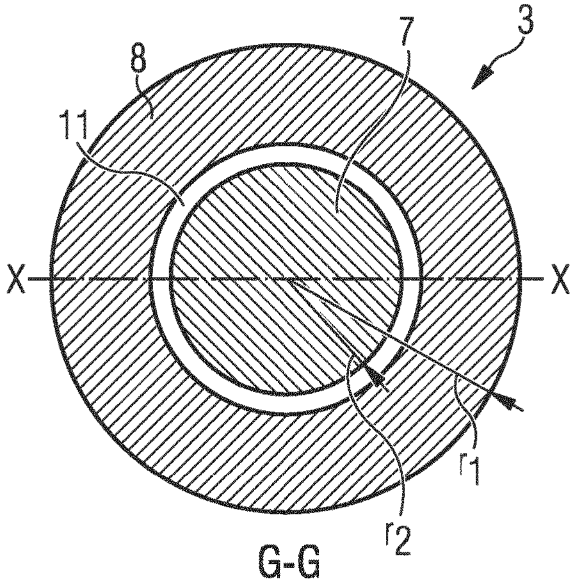

As can be seen in FIG. 2 in connection with FIGS. 3A and 3G, the conductor 1 comprises in its main sections 2 and 3 two concentric partial conductors 7, 8 electrically insulated from each other. In the transposing junction 4, the outer diameters and the overall shape of the partial conductors 2, 3 switch between each other.

In the first main section 2, the first partial conductor 7 has the shape of a hollow cylinder with an outer diameter $d_1$ corresponding to twice an outer radius $r_1$ of the first partial conductor 7. Furthermore, the second partial conductor 8 has the shape of a filled cylinder, i.e., a solid rod. In other embodiments, an inner partial conductor portion may by a hollow tube. The second partial conductor 8 has an outer diameter $d_2$ corresponding to twice an outer radius $r_2$ of the second partial conductor 8. The second partial conductor 8 is positioned centrally in the conductor 1.

The radius $r_1$ is larger than the radius $r_2$. The outer radius $r_1$ of the first partial conductor 7 is the outer radius of the conductor 1. The first partial conductor 7 fully encloses the second partial conductor 8. The first and second partial conductors 7, 8 are arranged concentrically and have closed outer surfaces in the entirety of the main sections 2, 3.

Along the entire length of the main sections 2, 3 and the transposing junction 4, the partial conductors 7, 8 are electrically insulated from each other by one or more gaps 11. In the main sections 2, 3, the gap 11 has the shape of a hollow tube. The gap 11 may be an air gap or filled with an insulating material to uphold the insulating distance of the partial conductors 7, 8 from each other.

As can be seen from a comparison of FIGS. 3A and 3G, the shape of the first partial conductor 7 switches between the main sections 2, 3 to the shape of the second partial conductor 8 and vice versa. Accordingly, the current paths provided by the partial conductors 7, 8 switch their distances from the center of the conductor 1.

As can be seen in FIG. 2 in connection with FIG. 3B, at the beginning of the transposing junction 4, the first partial conductor 7 changes from a closed tubular form to an open half tube. Accordingly, an opening 14 in the wall of the first partial conductor 7 is provided.

As can be seen in FIG. 2 in connection with FIG. 3C, the opening 14 provides a space through which a transposing portion 12 of the second partial conductor 8 can cross the wall of the first partial conductor 7 such that a current path leads radially outwards.

As can be seen in FIG. 2 in connection with FIG. 3D, the second partial conductor 8 has now switched its shape from a filled cylinder with the second outer radius $r_2$ to a hollow half cylinder with the first radius $r_1$.

Following further down the length of the conductor 1 to the position shown in FIG. 2 in connection with FIG. 3E, a further junction portion 13 switches the shape of the first partial conductor 7 from a hollow cylinder with the outer radius $r_1$ to a filled cylinder with the outer radius $r_2$.

As can be seen in FIG. 2 in connection with FIG. 3F, at the end of the transposing junction 4, the first partial conductor 7 has fully switched its shape, leaving an opening 14 which can be filled by the second partial conductor 8.

As can be seen in FIG. 2 in connection with FIG. 3G, the second partial conductor 8 now has a shape of a hollow cylinder of an outer radius $r_1$ and the first partial conductor 7 has a shape of a filled cylinder with an outer radius $r_2$.

Each of the partial conductors 7, 8 may be formed as a single, integrally formed piece. It is also possible that one or each of the partial conductors 7, 8 are formed as multiple pieces. As an example, a solid rod may be connected via a transposing junction to a hollow cylinder.

By same lengths of the first and second main sections 2, 3, and by providing two main sections 2, 3 or a number of main sections 2, 3 being a multiple of two, the current paths in the partial conductors 7, 8 run over equal portions of the conductor length at a distance closer to the center and at a distance farer away from the center. Therefore, loop currents are not generated, or at least minimized, and the current is not fully cancelled out in a central part of the conductor 1, thus significantly reducing the skin effect. In general, for the whole length of the conductor 1 there should be the same total length where the first partial conductor 7 runs at the smaller radius and the total length where the first partial conductor 7 runs at the larger radius. The same should be the case for the second partial conductor 8.

As a result, the current flows in almost the whole cross section of the conductor 1, except from the gaps 11 between the partial conductors 7, 8. This leads to a much smaller AC resistance of the conductor 1 compared to a conventional solid or tubular conductor 1 of the same outer diameter. The gaps 11 are as small as possible. In particular, the gap thickness can be much smaller than the thickness of each of the partial conductors 7, 8. Also the length of the transposing junction 4 can be much smaller than the length of each of the main sections 2, 3.

Figure 4:
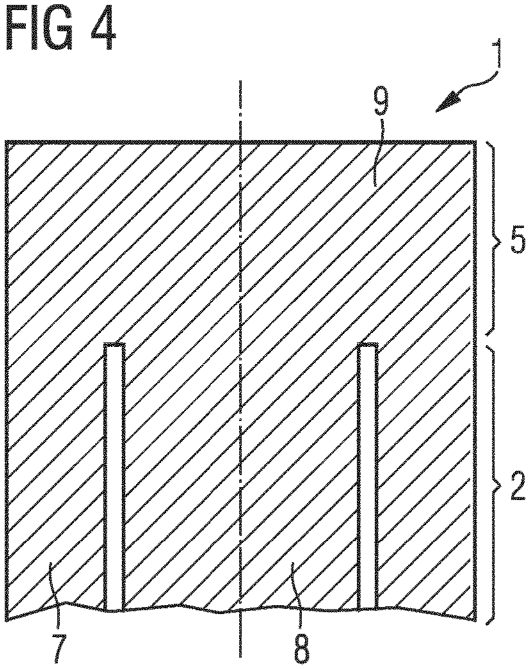
FIG. 4 shows an end section of a conductor with two partial conductors.

FIG. 4 shows an end section 5 of the double conductor 1 shown in FIG. 1. The other end section 6 has a corresponding structure.

In the end section 5, the partial conductors 7, 8 are electrically connected to each other. In particular, a joining junction 9 is provided which may have the shape of a solid circular plate, a solid bolt or a threaded connector, for example. By the joining junction 9, the current is divided into the two current paths provided by the two partial conductors 7, 8 or joined together.

In the end sections 5, 6 the conductor 1 can be electrically connected to an electric contact by any known method such as clamping, a threaded connection or a plug-in connection, for example.

Figure 5A:
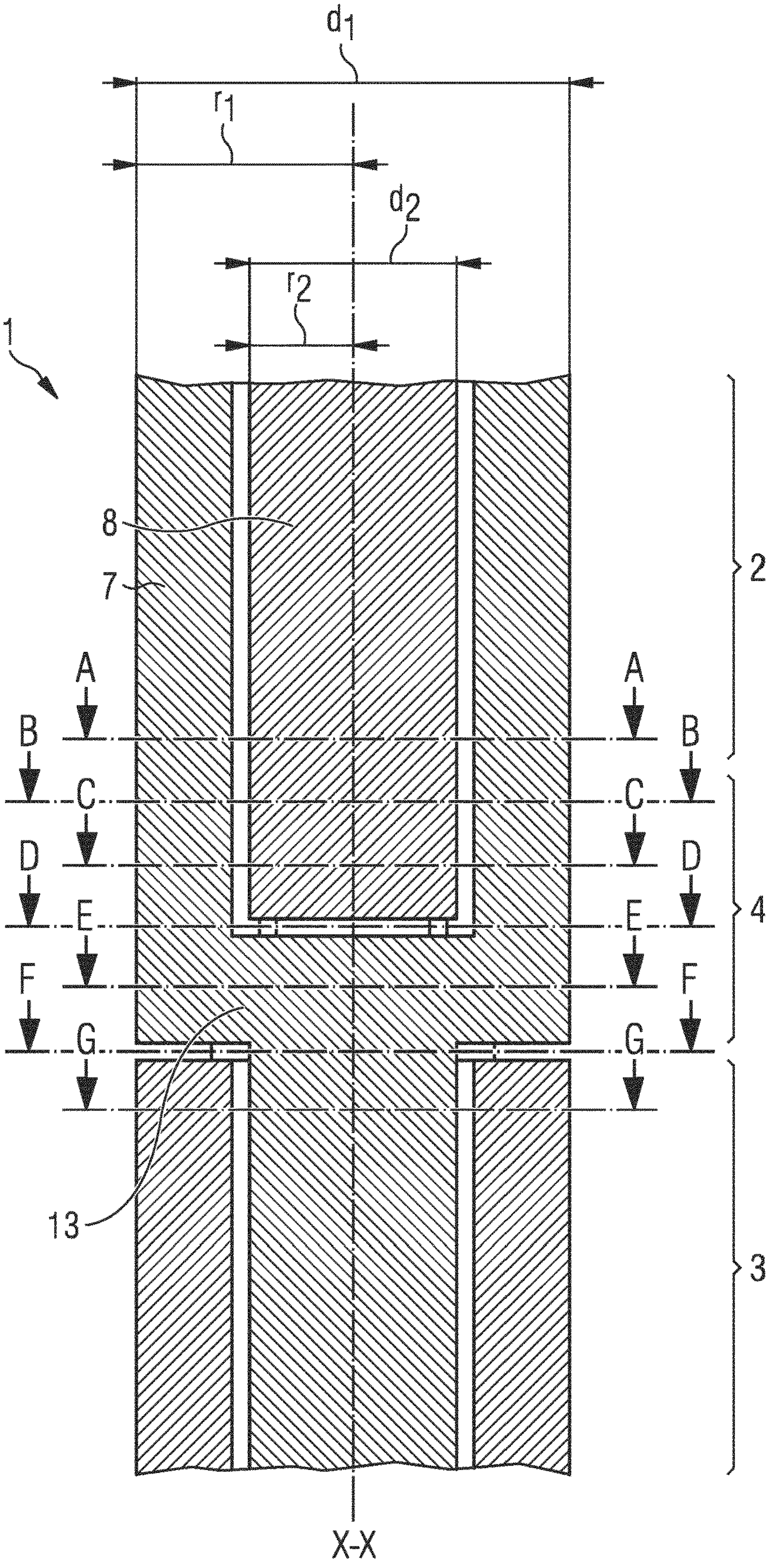
FIGS. 5A and 5B show a further embodiment of a conductor with two partial conductors in two longitudinal sectional views.
Figure 5B:
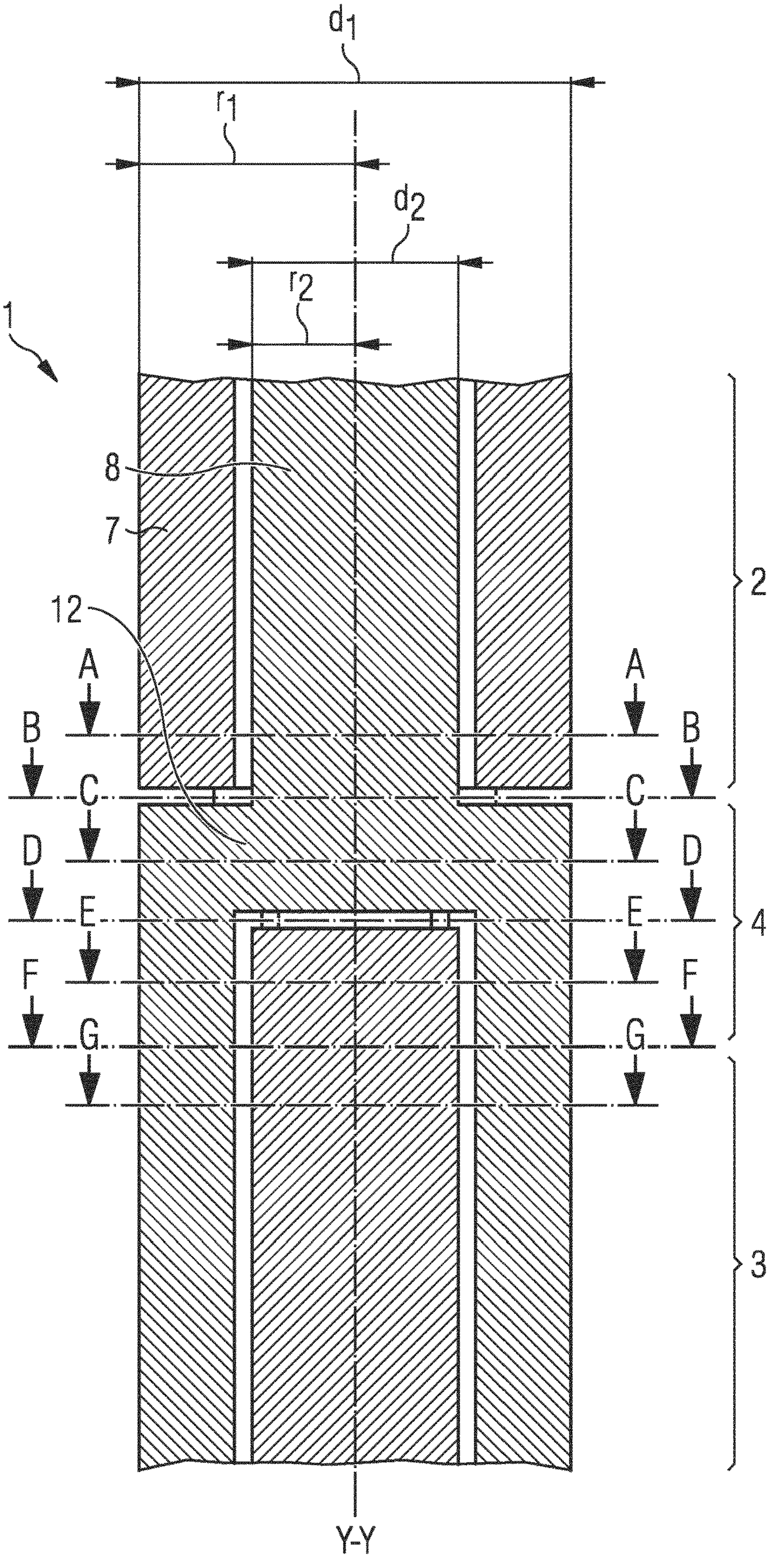

FIGS. 5A and 5B shows a further embodiment of a double conductor 1 in two sectional views, the second view in FIG. 5B being rotated about the length direction by 90°. FIGS. 6A to 6G show the conductor 1 in cross-sectional views at different positions marked by A-A to G-G.

The conductor 1 may have the general structure as shown in FIG. 1, wherein in the joining junctions 5, 6 the current is split into two current paths provided by the partial conductors 7, 8. In the transposing junction 4, the current paths switch from a first radial distance to a second radial distance and vice versa.

As can be seen from FIGS. 5A, 5B in connection with FIGS. 6A to 6G, in the main sections 2, 3 the conductor 1 has the same structure as the conductor 1 of the embodiment shown in FIGS. 2 and 3A to 3G. In particular, in the first main section 2, the first partial conductor 7 has the shape of a hollow cylinder with an outer radius $r_1$ and the second partial conductor 8 has the shape of a solid rod with an outer radius 1'2. In the second main section 3, the first partial conductor 7 has the shape of a solid rod with an outer radius $r_2$ and the second partial conductor 8 has the shape of a hollow cylinder with an outer radius $r_1$.

Figure 6A:
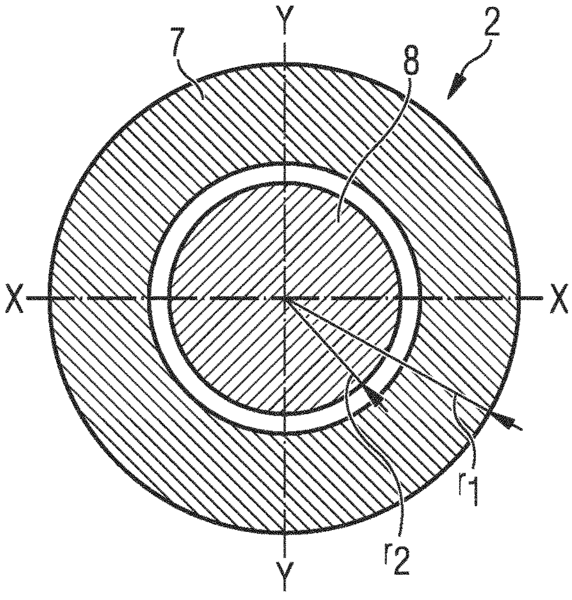
FIGS. 6A to 6G are cross-sectional views of the conductor of FIGS. 5A to 5B at different positions.
Figure 6B:
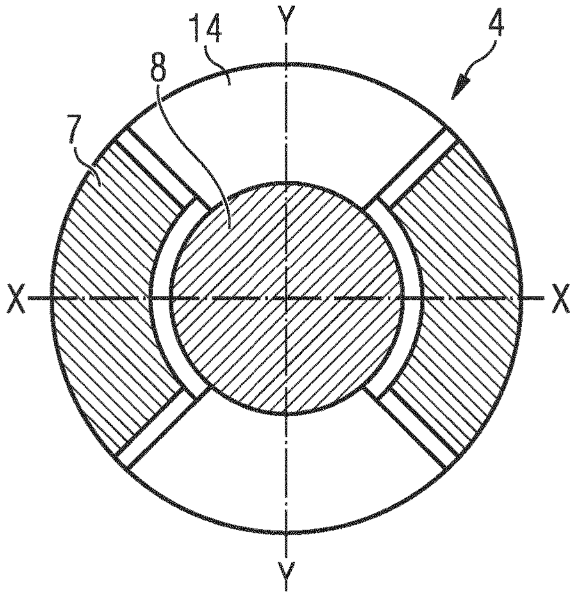
Figure 6C:
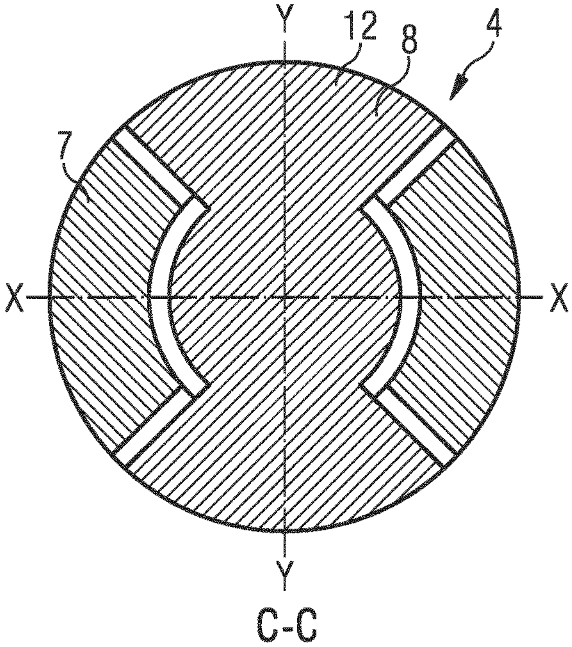
Figure 6D:
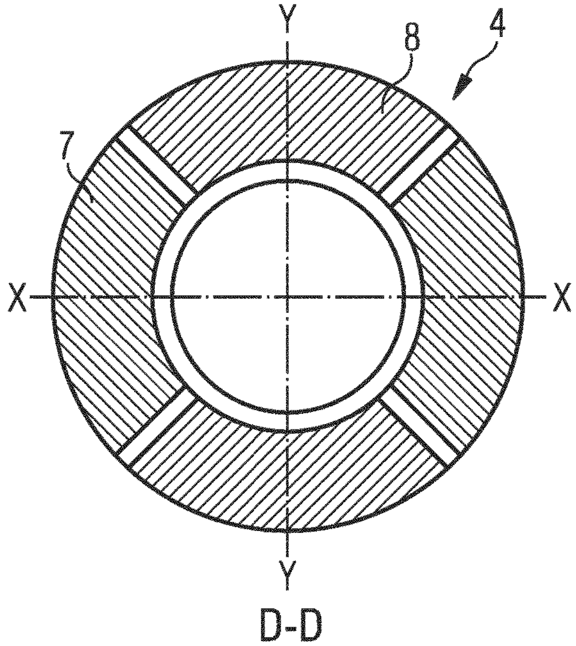
Figure 6E:
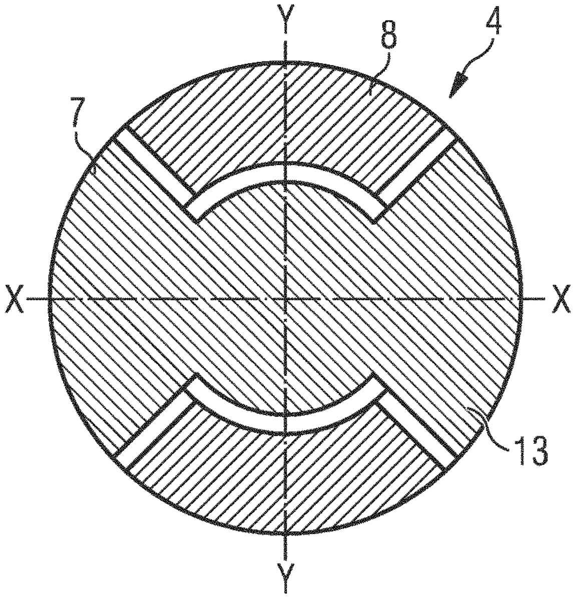
Figure 6F:
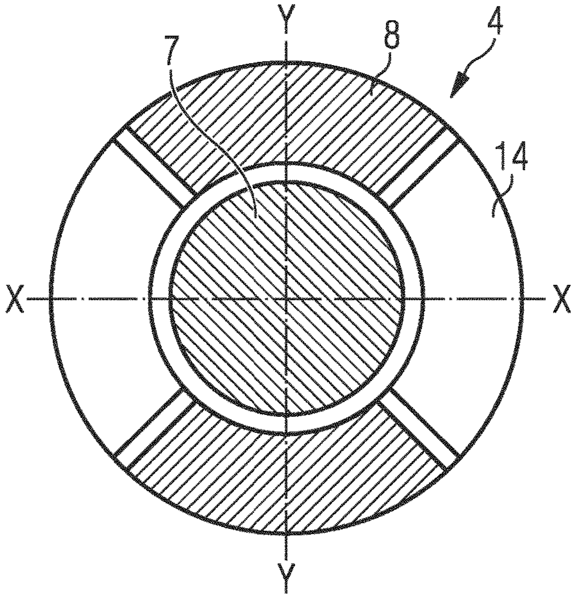
Figure 6G:
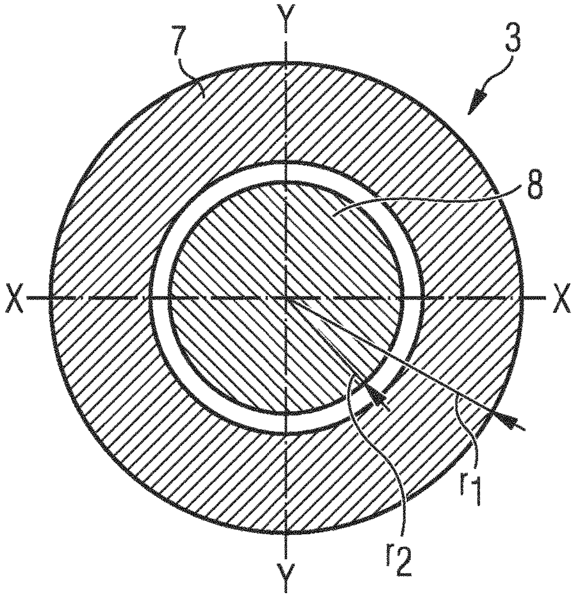

In the transposing junction 4, the shapes of the partial conductors 7, 8 switch with help of a first transposing portion 12 and a second transposing portion 13, as can be seen in FIGS. 5A and 5B in connection with FIGS. 6C and 6E. In difference to the first embodiment, the cylindrical wall of the first partial conductor 7 first opens up into two opposite quarter cylindrical openings 14, see FIG. 6B. Correspondingly, each of the transposing portions 12, 13 comprise oppositely arranged quarter portions. Otherwise, the switching of shapes in the transposing junction 4 corresponds to the switching of shapes of the foregoing embodiment.

Due to the transposing portions 12, 13 each comprising quarter portions being opposite to each other, the current flows more uniformly from one radial distance to the other radial distance. Furthermore, this makes the parts of the conductors 7, 8 more mechanically stable and resistant to bending. The transposing portions 12, 13 are arranged with the current running to two sides of the conductors 7, 8. It is also possible to arrange the transposing portions 12, 13 in other ways, with the current running to three, four or more sides, to distribute the current even more homogenously and to add rigidity to the construction.

Figure 7:
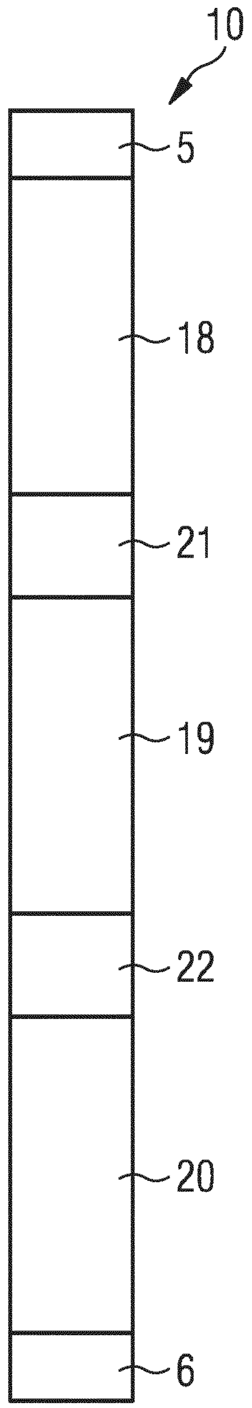
FIG. 7 shows an embodiment of a conductor with three partial conductors in a schematic side view.

FIG. 7 shows a further embodiment of a conductor 10. In difference to the foregoing embodiments, the conductor 10 has three partial conductors forming three separate current paths. Accordingly, the conductor 10 is a triple conductor.

The conductor 10 has three main sections 18, 19, 20. As in the foregoing embodiments, in each of the main sections 18, 19, 20, each of the partial conductors and, thus, each of the current paths runs at a fixed radial distance, homogenously along the length of the conductor 10. In the transposing junctions 21, 22 between the main sections 18, 19, 20, each of the current paths switches its radial position.

In other embodiments for a conductor 10 with three partial conductors the number of main sections can be larger than three and a multiple of three. When the number of main sections is a multiple of three (including three) and the main sections are of the same lengths, the current in each of the partial conductors flows in the same portion of the length of the conductor at the innermost radius, the intermediate radius and the outermost radius. Thereby, the loop currents induced by the magnetic flux between the conductors are minimized and the skin effect can be avoided or at least significantly reduced.

Figure 8:
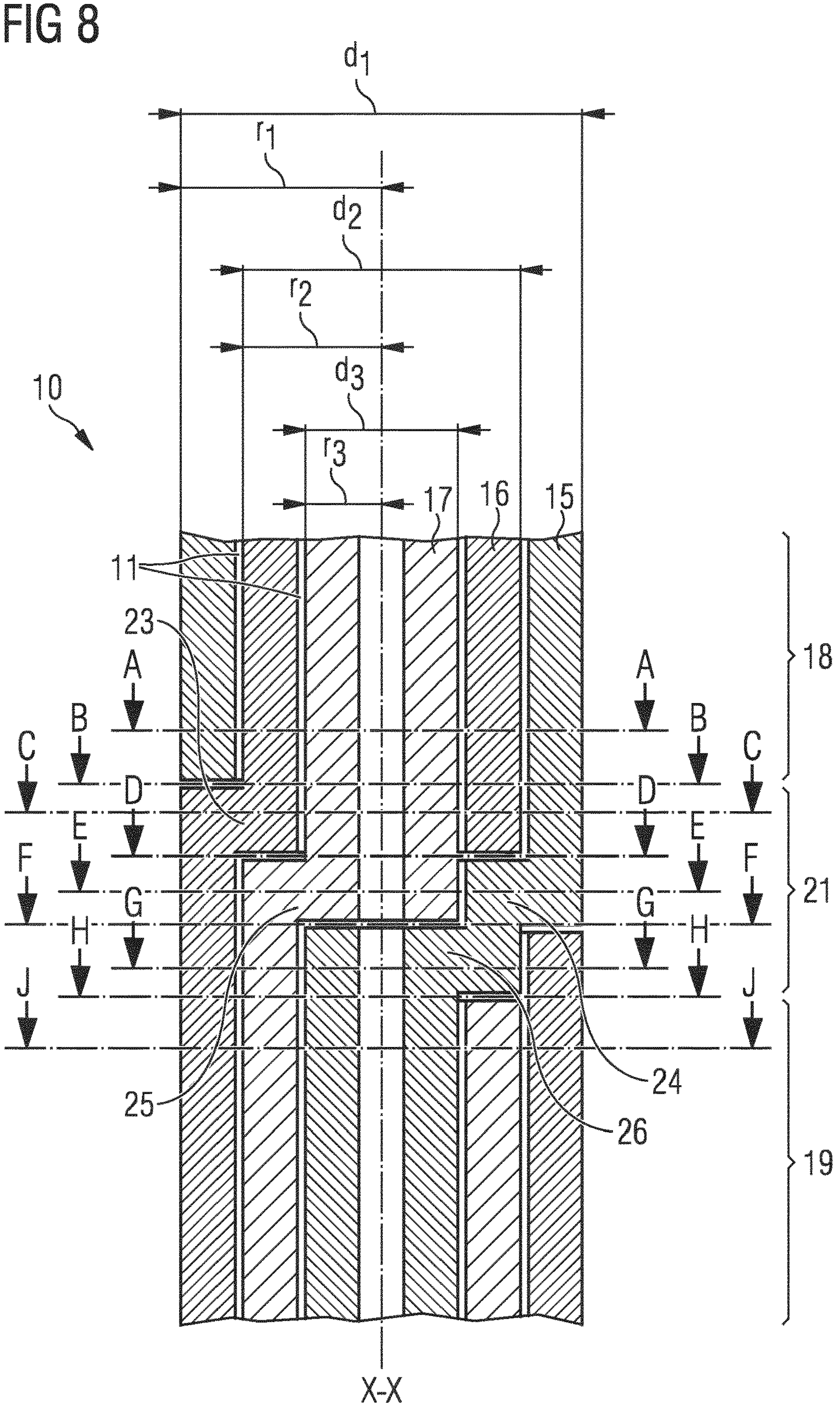
FIG. 8 shows an embodiment of a conductor with three partial conductors in a longitudinal sectional view.

FIG. 8 shows an embodiment of a triple conductor 10 in a longitudinal sectional view. The conductor 10 can be the conductor shown in FIG. 7. FIGS. 9A to 9I show cross-sectional views of the conductor 10 at different positions denoted by A-A to I-I.

The conductor 10 has three partial conductors 15, 16, 17. As in a double conductor, the partial conductors 15, 16, 17 are electrically insulated from each other along the length of the conductor 10, except from the end sections 5, 6, where the partial conductors 15, 16, 17 are joined together.

In FIG. 8, only the first two main sections 18, 19 and only one transposing junction 21 of the three main sections 18, 19, 20 and two transposing junctions 21, 22 (see FIG. 7) are depicted. The third main section 20 adjoins the end of the first or second main section 18, 19, with the second transposing junction 22 there between. The third main section 20 has the same structure as the first and second main sections 18, 19. The second transposing junction 22 has the same structure as the first transposing junction 21.

Figure 9A:
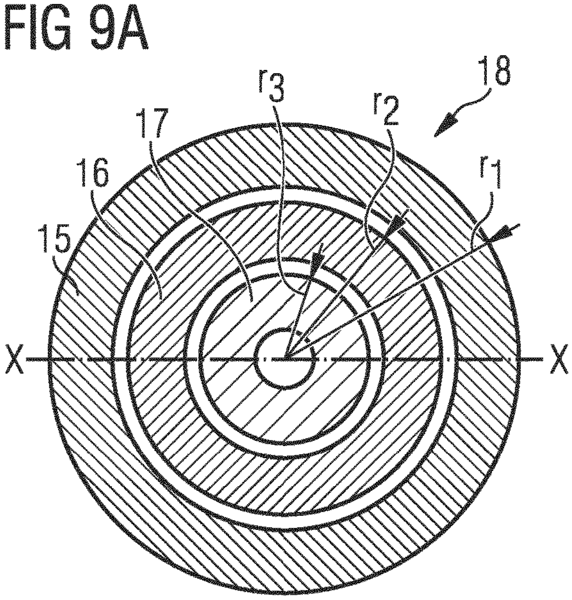
FIGS. 9A to 9I show cross-sectional views of the conductor of FIG. 8 at different positions.
Figure 9B:
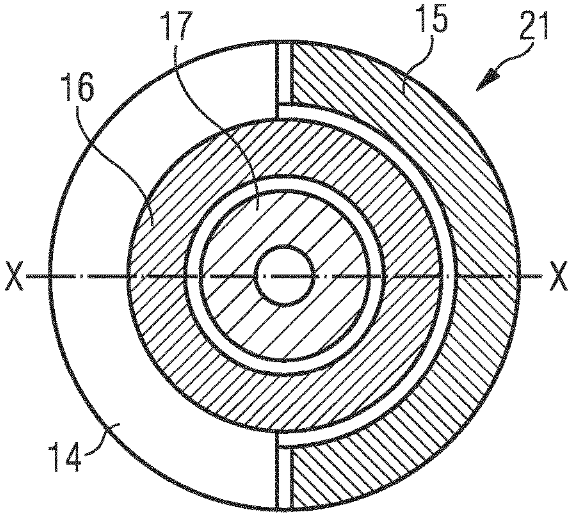
Figure 9C:
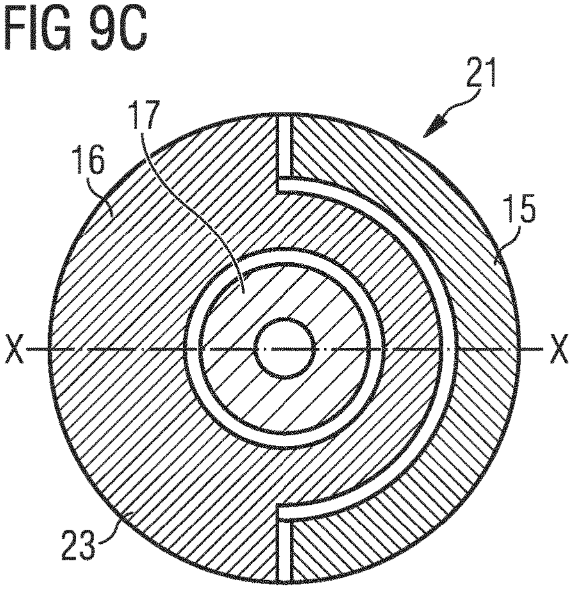
Figure 9D:
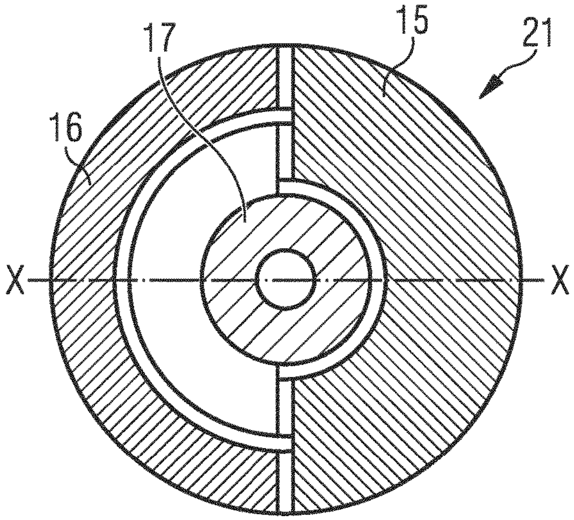
Figure 9E:
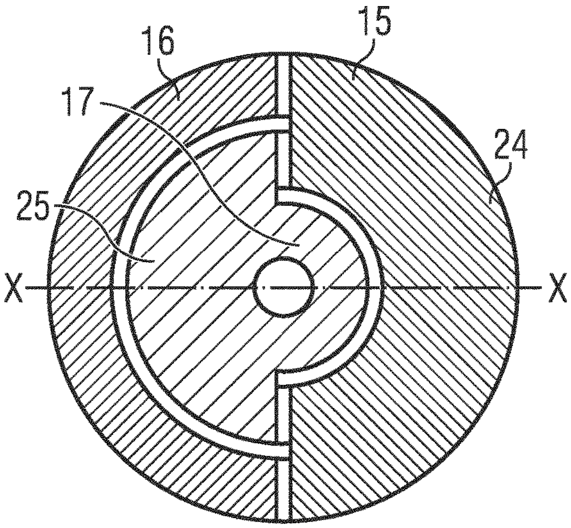
Figure 9F:
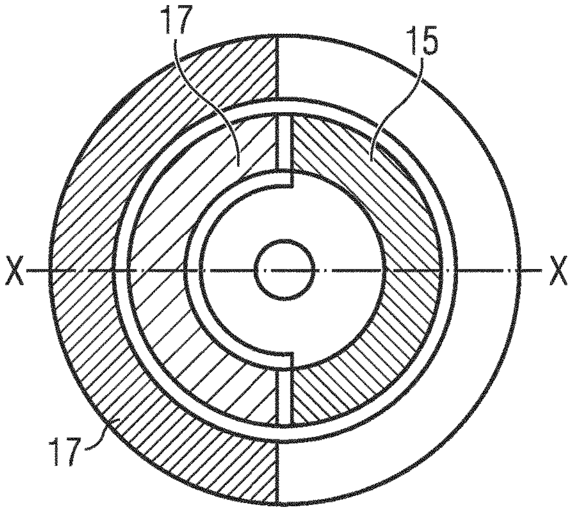
Figure 9G:
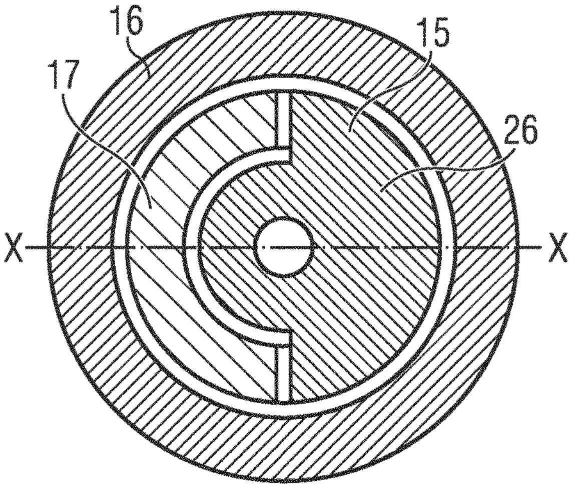
Figure 9H:
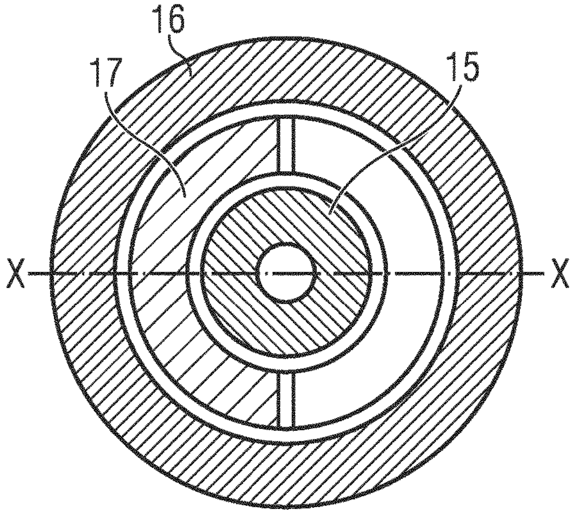
Figure 9I:
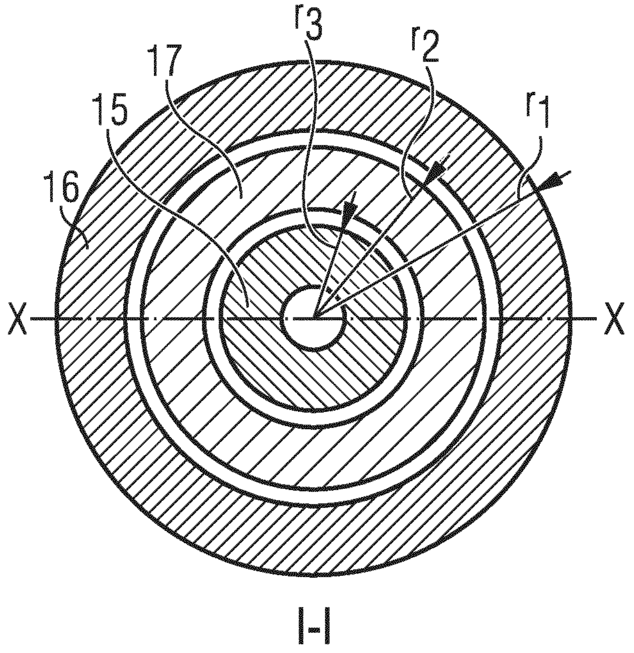

As can be seen from FIG. 8 and FIGS. 9A and 9I, in each of the main sections 18, 19, 20, each of the conductors 15, 16, 17 has the shape of a homogeneous hollow cylinder with a fixed outer diameter $d_1$, $d_2$, $d_3$ corresponding to twice the outer radius $r_1$, $r_2$, $r_3$, and a fixed thickness of the cylinder wall. The three hollow cylinders are concentrically arranged. An innermost cylinder is enclosed by a middle cylinder. The middle cylinder is enclosed by an outer cylinder. It is also possible that in each of the main sections 18, 19, 20, the inner one of the conductors 15, 16, 17 has the shape of a solid rod instead of a hollow cylinder.

In the transposing junctions 21, 22, the outer radius of each of the partial conductors 15, 16, 17 changes. In particular, as can be seen from FIG. 8, in the first main section 18, the first conductor 15 has the outer radius $r_1$. The second conductor 16 is enclosed by the first conductor 15 and has the outer radius $r_2$. The third conductor 17 is enclosed by the first and second conductors 15, 16 and has the smallest outer radius $r_3$. Within the main sections 18, 19, 20, the walls of each of the partial conductors 15, 16, 17 is homogenous and is not interrupted.

In the shown embodiment, the conductors 15, 16, 17 have the same wall thickness in each of the main sections 18, 19, 20. It is also possible that the wall thickness is different, depending on the specific outer radius $r_1$, $r_2$, $r_3$.

In the transposing junctions 21, 22 the walls of the partial conductors 15, 16, 17 are stepwise transposed from one radius to another radius. As in the double conductor, the walls of the partial conductors 15, 16, 17 open up and give room for transposing portions 23, 24, 25, 26.

As can be seen from FIG. 8 and FIGS. 9B, 9C and 9D, at the start of the transposing junction 21, the wall of the outermost, first partial conductor 15 opens up such that the middle, second partial conductor 16 can be partially transposed by a transposing portion 23 from the middle radius $r_2$ to the outer radius $r_1$. The opening 14 has the shape of a half circle.

As can be seen from FIG. 8 and FIGS. 9D, 9E and 9F, at a second part of the transposing junction 21, the outermost, first partial conductor 15 is partially transposed by a transposing portion 24 from an outer radius $r_1$ to a middle radius $r_2$. At the same time, the innermost, third partial conductor 17 is partially transposed by a transposing portion 25 from the inner radius $r_3$ to the middle radius $r_2$.

As can be seen from FIG. 8 and FIG. 9G, the now outermost, second partial conductor 16 then closes its wall to a closed tubular form.

As can be seen from FIG. 8 and FIGS. 9F to 9H, in a further step, the first conductor 15 completes its transposal by a transposing portion 26 from the middle radius $r_2$ to the inner radius $r_{13}$. Furthermore, the third partial conductor 17 completes its transposal to the middle radius $r_2$.

In a further transposing junction 22 (see FIG. 7), the radii of the partial conductors 15, 16, 17 are correspondingly transposed. Thus, in three main sections 18, 19, 20 each of the partial conductors 15, 16, 17 has the first radius $r_1$ in one of the main sections, the second radius $r_2$ in one of the main sections and the third radius $r_3$ in one of the main sections.

This ensures that the magnetic flux flowing through surface area portions between pairs of the conductors 15, 16, 17 cancel out in large part, the induced loop currents in the partial conductors are minimized and the skin effect can be prevented or at least reduced.

Also, in the case of the triple conductor 10, the transposing junctions 21, 22 can be formed in a more symmetrical way, such that the walls of the partial connections open up into several symmetrically arranged parts, similar to the embodiment of the double conductor 1 shown in FIGS. 6C and 6E.

The principle of the transposal in conductors with more than three partial conductors corresponds to the transposal shown for the double and triple conductors.

Figure 10:
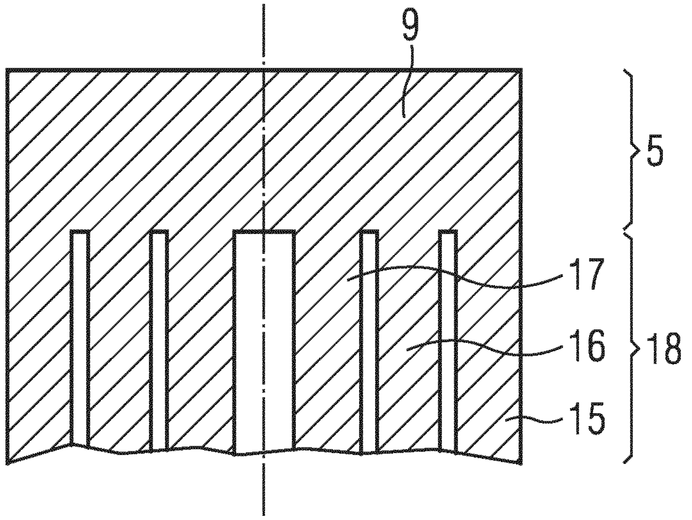
FIG. 10 shows an end section of a conductor with three partial conductors.

FIG. 10 shows an end section 5 of a conductor 10 with three partial conductors 15, 16, 17. The conductor 1 may be the triple conductor 10 shown in FIGS. 8 to 9I.

As for the double conductor 1 of FIG. 4, the partial conductors 15, 16, 17 are connected by a joining junction 9.

Figure 11:
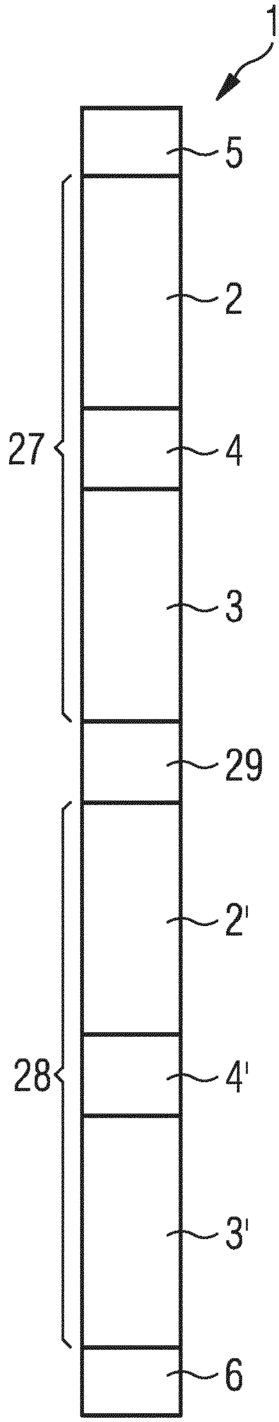
FIG. 11 shows a further embodiment of a conductor with two partial conductors in a schematic view.

FIG. 11 shows a further embodiment of a double conductor 1 in a schematic view. In difference to the double conductor 1 of FIG. 1, the double conductor 1 has two portions 27, 28, each consisting of two main sections 2, 3 and 2', 3', respectively, and a transposing junction 4 and 4', respectively. The portions 27, 28 are connected to each other by a further transposing junction 29, which has the same structure of the transposing junctions 4, 4' but a different allocations of the partial conductors.

In the first main section 2 and the further first main section 2', the conductor 1 has the same inner structure with the same allocation of the partial conductors to the inner structure. The same applies for the second main section 3 and the further second main section 3'. Accordingly, the first portion 27 composed by the first main section 2, the transposing junction 4 and the second main section 3 is identically repeated in the second portion 28 composed by the further first main section 2', further transposing junction 4' and further second main section 3'.

In the case of a triple conductor 10, two portions can be provided, with each of the portions comprising three main sections and two transposing junctions.

In further embodiments of double conductors 1 or triple conductors 10, more portions containing main sections and transposing junctions can be provided. Generally, the number of main sections should be a multiple of the number of partial conductors. In addition to that, the main sections should have lengths such that each of the partial conductors takes up each outer radius over the same total length. In this case, each of the current paths runs over equal portions of the conductor length at each of the radii, thus minimizing the loop currents and avoiding or at least reducing the skin effect. Each of the main sections can have the same length. It is also possible that the main sections 2, 3 have different lengths than the further main sections 2', 3'.

Figure 12:
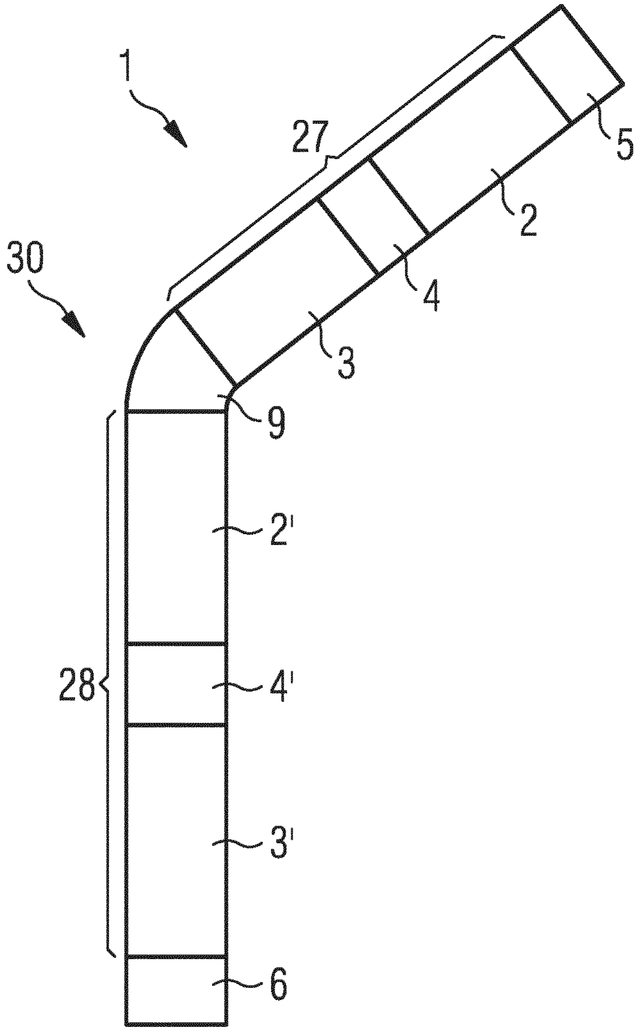
FIG. 12 shows a further embodiment of a conductor with two partial conductors in a schematic view.

FIG. 12 shows a further embodiment of a double conductor 1, the double conductor 1 having a bend 30 between two portions 27, 28 of the conductor 1.

The bend 30 is provided by a joining junction 9 joining the partial conductors in each of the adjacent main section 2', 3. The joining junction 9 may be a portion of a rigid rod, for example. Due to the joining junction 9, the first portion 27 is decoupled from the second portion 28 with respect to the loop currents generated in each of the portions.

The main sections 2, 3 of the first portion 27 have the same lengths. The main sections 2', 3' of the second portion 28 have the same lengths. However, the main sections 2, 3 of the first portion 27 have a different length than the main seconds 2', 3' of the second portion. In further embodiments, portions 27, 28 of different lengths may be connected by a joining junction without that a bend is present.

In other embodiments, a bend 30 can be provided by a transposing junction, in which the partial conductors switch their shapes but are not electrically connected to each other.

The conductors 1, 10 of all embodiments, and in particular the partial conductors including transposing portions, can be manufactured by additive manufacturing technologies, wherein thin layers of the partial conductors are added one by one. This process can run in the direction along the length of the conductor and the shapes of the layers which have to be added in each part of the process are visible from FIGS. 2 to 3G, 5A to 6G and 8 to 9I, respectively.

It is also possible to manufacture one or more transposing junctions or portions as separate components. In this case the transposing junctions can be fixed subsequently to the main sections of the conductor. The transposing junctions can be manufactured using additive manufacturing methods. Parts of the transposing junction can also be manufactured by machining, i.e., by removing material, and subsequent assembling.

In order to prevent the parts of the conductor to move with respect to each other, and coming into electrical contact, electrically insulating spacers may be inserted between the neighboring partial conductors in the main sections, especially in the areas close to the transposing junctions.

Additionally, the whole space between the partial conductors in the main sections and between separate parts of the transposing junctions can be filled with an insulating material. Suitable materials are hardenable resin such as epoxy, acrylic or silicone-based resin, for example. The resin may contain a filler, in particular a high-thermal-conductivity electrically insulating filler, such as, for example, boron nitride or aluminum nitride.

An alternative method to manufacture the conductor is a metal casting process. This is particularly suitable for conductors made of aluminum and its alloys. In this method, a core insert is prepared, for example made of a ceramic material. The core insert is in the shape of the gaps between the parts of the conductor. The shape of this empty space in the area of the transposing junction is easily derivable from the embodiments shown in FIGS. 2 to 3G, 5A to 6G and 8 to 9I. In the area of the end sections, the core insert can have elements protruding further upward than the slits visible in FIGS. 4 and 10 so that the core insert can be mechanically fixed in the mold.

The core insert itself can be manufactured using additive manufacturing methods. After casting, the conductor is machined, so that the elements of the core insert located in the slits reaching the outer surface of the transposing junctions are exposed. In this way, the partial conductors providing the separate current paths become electrically insulated from each other.

A number of calculations have been made, in order to assess how much more current can be conducted by the conductors according to the invention in comparison to standard conductors. In particular, standard rod-shaped and tubular conductors are compared to the conductors according to the invention, with the same outer diameters. In case of the standard tubular conductors, the inner diameter of the conductor was optimized so as to minimize its AC resistance, so that the optimized standard conductor is used for the comparison.

As an example, the calculations show that replacing a 60 mm standard copper rod conductor with a double conductor of the same outer diameter, an AC resistance reduction factor of 0.69 is achieved. This provides the possibility to increase the operating current in the same device by up to 120% without increasing ohmic losses and, thus, without increasing the temperature. For a 90 mm copper rod conductor the corresponding numbers are 0.60 and 130%. When replacing the standard 90 mm conductor with a triple conductor, the AC resistance is half the AC resistance of the standard conductor and the operating current can be increased up to more than 140%.

Also for larger diameter aluminum conductors, which are commonly used in high-current applications, e.g., in components of generator circuits in power plants, such as generator bushings, LV step-up transformer bushings, generator circuit breakers, double conductors can provide operating current gains of between 130% and 140%. By using triple conductors, gains between 150% and 170% can be achieved without that the outer diameter of the conductor or the dimensions of the insulating components around the conductors is increased.

REFERENCE NUMERALS

1 double conductor
2, 2' first main section
3, 3' second main section
4, 4' transposing junction
5 end section
6 end section
7 first partial conductor
8 second partial conductor
9 joining junction
10 triple conductor
11 gap
12 transposing portion
13 transposing portion
14 opening
15 first partial conductor
16 second partial conductor
17 third partial conductor
18 first main section
19 second main section
20 third main section
21 transposing junction
22 transposing junction
23 transposing portion
24 transposing portion
25 transposing portion
26 transposing portion
27 first portion
28 second portion
29 further transposing junction
30 bend
L length direction
R radial direction
$r_1$ first outer radius
$r_2$ second outer radius
$r_3$ third outer radius
$d_1$ first outer diameter
$d_2$ second outer diameter
$d_3$ third outer diameter
m number of main sections
n number of partial conductors

The invention claimed is:

1. A conductor for conducting electric current, comprising along its length at least two main sections comprising a first main section and a second main section, and comprising at least one transposing junction connecting adjacent ones of the main sections, the conductor comprising at least two partial conductors comprising at least a first partial conductor and a second partial conductor, each of the partial conductors running through the main sections and the transposing junction and being electrically insulated from each other in the main sections and the transposing junction, each of the partial conductors having in each of the main sections an outer diameter, wherein in the first main section, the outer diameter of the first partial conductor is larger than the outer diameter of the second partial conductor, and in the second main section the outer diameter of the second partial conductor is larger than the outer diameter of the first partial conductor, wherein the conductor comprises a first portion and a second portion, each of the portions comprising the at least two main sections and the at least one transposing junction between the main sections, and comprising a joining junction between the portions, wherein in the joining junction the partial conductors are electrically connected to each other and wherein in the at least one transposing junction the partial conductors remain continuously electrically insulated from each other.

2. The conductor of claim 1, wherein in the first main section the first partial conductor has a shape of a cylinder having a first outer radius and the second partial conductor has a shape of a cylinder of a second outer radius, wherein the first outer radius is larger than the second outer radius.

3. The conductor of claim 1, wherein in the first main section the first partial conductor encloses the second partial conductor and in the second main section the second partial conductor encloses the first partial conductor.

4. The conductor of claim 1, wherein an interior structure of the conductor is identical in the main sections and wherein the main sections have the same lengths.

5. The conductor of claim 1, wherein in each of the main sections the partial conductors have a constant geometry along the length of the respective main section.

6. The conductor of claim 1, wherein in the transposing junction each of the partial conductors has one or more openings in its wall to enable one or more transposing portions of the other one of the partial conductors to cross the wall.

7. The conductor of claim 1, wherein the partial conductors are separated by gaps from each other, wherein the gaps are air gaps and/or insulating inserts.

8. The conductor of claim 1, wherein the partial conductors are only electrically connected at the joining junction.

9. The conductor of claim 1, wherein each of the partial conductors is formed as a single, integrally formed piece.

10. The conductor of claim 1, having a bend being provided by the joining junction electrically connecting the partial conductors or being provided by the transposing junction changing the outer diameters of the partial conductors.

11. The conductor of claim 1, wherein the conductor comprises:

a number of the partial conductors, the number being larger than two; and a number of the main sections, wherein adjacent ones of the main sections are connected by one of the at least one transposing junction, wherein the number of the main sections is a multiple of the number of the partial conductors.

12. The conductor of claim 1, wherein in each of the main sections each of the partial conductors has a tubular shape.

13. A method of manufacturing the conductor of claim 1, wherein at least a part of the conductor is manufactured by an additive manufacturing method or by a molding method.

14. The method of claim 13, wherein the conductor is at least partially formed by casting, wherein an insert is positioned in a mold, wherein the insert provides gaps insulating the partial conductors from each other.

15. A use of the conductor of claim 1 for conducting electric current with an alternating current (AC) component.

16. The use of the conductor of claim 15 wherein in the first main section of the conductor the first partial conductor has a shape of a cylinder having a first outer radius and the second partial conductor has a shape of a cylinder of a second outer radius, wherein the first outer radius is larger than the second outer radius.

17. The use of the conductor of claim 15, wherein in the first main section of the conductor, the first partial conductor encloses the second partial conductor and in the second main section the second partial conductor encloses the first partial conductor.

18. The use of the conductor of claim 15, wherein an interior structure of the conductor is identical in the main sections of the conductor and wherein the main sections have the same lengths.

19. The use of the conductor of claim 15, wherein in each of the main sections of the conductor, the partial conductors have a constant geometry along the length of the respective main section.

20. The use of the conductor of claim 15, wherein in the transposing junction each of the partial conductors has one or more openings in its wall to enable one or more transposing portions of the other one of the partial conductors to cross the wall.

* * * * *